United States Patent [19]

Percec et al.

[11] Patent Number: 5,084,352
[45] Date of Patent: Jan. 28, 1992

[54] MULTILAYERED BARRIER STRUCTURES FOR PACKAGING

[75] Inventors: Elena S. Percec, Pepper Pike; Lucy Melamud, Beachwood; Gerald P. Coffey, Lyndhurst, all of Ohio

[73] Assignee: The Standard Oil Company, Cleveland, Ohio

[21] Appl. No.: 437,509

[22] Filed: Nov. 15, 1989

[51] Int. Cl.$^5$ .................... B32B 27/36; C08L 51/04
[52] U.S. Cl. .................. 428/412; 428/423.5; 428/423.7; 428/424.2; 428/424.4; 428/424.6; 428/424.7; 428/424.8; 428/473.5; 428/451; 428/475.2; 428/476.3; 428/476.9; 428/483; 428/516; 428/517; 428/518; 428/520; 428/521; 264/176.1; 264/241; 525/71
[58] Field of Search ............ 428/412, 423.5, 423.7, 428/424.2, 424.4, 424.6, 424.7, 424.8, 473.5, 451, 475.2, 476.3, 476.9, 483, 516, 517, 518, 520, 521

[56] References Cited

U.S. PATENT DOCUMENTS

| | | | |
|---|---|---|---|
| 3,586,737 | 6/1971 | Duke et al. | 260/879 |
| 3,634,547 | 1/1972 | Rose et al. | 260/876 |
| 3,652,726 | 3/1972 | Nield et al. | 260/876 |
| 3,763,278 | 10/1973 | Griffith | 260/876 |
| 3,766,142 | 10/1973 | Nield et al. | 260/47 AU |
| 3,914,337 | 10/1975 | Giddings et al. | 260/876 R |
| 3,954,913 | 5/1976 | Uebele et al. | 260/880 R |
| 3,962,371 | 6/1976 | Alberts et al. | 260/876 R |
| 4,082,895 | 4/1978 | Backderf et al. | 428/412 |
| 4,109,037 | 8/1978 | Nohara | 428/35 |
| 4,123,576 | 10/1978 | Kobayashi et al. | 428/516 |
| 4,153,648 | 5/1979 | Li et al. | 260/896 |
| 4,160,001 | 7/1979 | Rosen | 525/230 |
| 4,195,135 | 3/1980 | Li et al. | 525/69 |
| 4,243,725 | 1/1981 | Wiggins et al. | 428/517 |
| 4,299,931 | 11/1981 | Coran et al. | 525/95 |
| 4,307,207 | 12/1981 | Wiggins et al. | 525/66 |
| 4,339,502 | 7/1982 | Gerry et al. | 428/411 |
| 4,359,506 | 11/1982 | Wiggins et al. | 428/412 |
| 4,397,987 | 8/1983 | Cornell | 525/75 |
| 4,415,520 | 11/1983 | Wiggins et al. | 264/171 |
| 4,452,835 | 6/1984 | Vasudevan | 428/35 |
| 4,588,774 | 5/1986 | Dean | 525/73 |
| 4,605,700 | 8/1986 | Le-Khac | 525/73 |
| 4,753,845 | 6/1988 | Sumi et al. | 428/327 |
| 4,772,348 | 9/1988 | Hirokawa et al. | 156/272.6 |

FOREIGN PATENT DOCUMENTS

| | | |
|---|---|---|
| 142183 | 5/1985 | European Pat. Off. |
| 218245-A | 4/1987 | European Pat. Off. |
| 277350 | 8/1988 | European Pat. Off. |

OTHER PUBLICATIONS

Technical Bulletin SC:94187 from Shell Co. entitled "Kraton FG 1901X Rubber".

*Primary Examiner*—P. C. Sluby
*Attorney, Agent, or Firm*—Larry W. Evans; Joseph G. Curatolo; Sue E. Phillips

[57] ABSTRACT

Multilayered barrier film products providing gas and moisture barrier properties. The film products comprise at least a first polymer film having low permeability to moisture and a heterogeneous polymer blend film containing a gas barrier polymer and a second polymer distributed in the gas barrier polymer, so as to allow the heterogeneous polymer blend film to adhere to the first polymer film. A method for the preparation of multilayered barrier film products includes the steps of forming a gas barrier polymer film from a heterogeneous polymer blend containing a gas barrier polymer and a second polymer and, bonding a moisture barrier polymer film to at least one side of the gas barrier polymer film. The method can be practiced utilizing conventional coextrusion equipment.

15 Claims, No Drawings

MULTILAYERED BARRIER STRUCTURES FOR PACKAGING

TECHNICAL FIELD

This invention relates to multilayered films which display improved impermeability to oxygen and moisture as well as toughness and processability. The multilayered film products employ barrier resins, such as high nitrile polymers, ethylene-vinyl alcohol copolymers and polyvinylidene chloride-polyvinyl chloride copolymers, all of which are noted for their gas barrier properties, and polyolefins, which are characterized by high strength, excellent moisture and water vapor resistance, fair chemical resistance and variable processability. While no single polymer or copolymer can possess all of these properties, the proper combination of different polymers in multilayered structures has been found to provide a good balance. Such films are useful for packaging applications, particularly in the food industry.

The present invention also provides structures having barrier and/or chemical resistance, but not involving polyolefins as well as other structures that do not employ a gas barrier or chemical resistant layer. In addition to multilayered film or sheet structures prepared by lamination or coextrusion techniques, other types of articles such as bottles or jars can also be produced via known compression and blow molding or thermoforming techniques. A significant feature of the structures and articles of the present invention is that there is no need for an adhesive tie layer between adjacent, dissimilar layers.

BACKGROUND OF THE INVENTION

Properties such as protection from oxygen and moisture are of great importance in plastic packaging applications, as are toughness and processability. Generally, no single polymer is capable of providing the correct balance of all the properties that are required for various types of packaging applications. Polyolefins, for instance, are characterized by toughness, excellent moisture and water vapor resistance and fair chemical resistance, but suffer from poor gas barrier properties and variable processability. High nitrile polymers, on the other hand, have outstanding gas barrier properties but only modest water and vapor properties.

While it would be highly advantageous to incorporate the desirable characteristics of each type of polymer into a single material, barrier resins such as high nitrile polymers are not readily combined with polyolefins. Heretofore, when it has been desirable to form a multilayered film product comprising outer layers of tough, moisture resistant polyolefins and an inner layer providing gas barrier protection, it has been necessary to employ tie layers therebetween because of the lack of adhesion and incompatibility of the polyolefin and barrier resin layers. Thus, where three layers are functional, an additional two layers have been required to form such products.

U.S. Pat. No. 4,339,502, for instance, is directed toward a laminated structure comprising nitrile barrier resin and thermoplastic resin layers joined by a tie layer comprising a nitrile barrier resin and a vinyl aromatic diene block copolymer rubber.

U.S. Pat. No. 4,359,506 is directed toward a laminated structure which combines outer layers of a nitrile barrier resin and a thermoplastic resin with a tie layer comprising a mixture of a nitrile barrier resin, a halogenated polyolefin and a thermoplastic resin.

U.S. Pat. No. 4,415,520 is directed toward a process for bonding together a nitrile barrier resin with a thermoplastic resin to produce a laminate. A tie layer comprising a mixture of a nitrile barrier resin and a halogenated polyolefin and a thermoplastic resin other than the first two polymers is disclosed for bonding the first two film layers together.

The multilayer concept is also employed to obtain barrier structures containing poly(ethylene-vinyl alcohol) as a barrier layer bonded to polyolefins via adhesive tie layers. For a discussion of this work, see Foster, R. "EVAL RESINS, THE SUPER CHALLENGE"; proceedings of Food Plast. 84/85, March, 1985.

It has now been found possible to structure the two polymers into a multilayered material by the use of a heterogeneous inner layer. In particular, an inner layer is formed comprising a barrier polymer, or polymer providing another desired property, and a polymer compatible with the exterior layer. The inner layer provides a dual function of gas barrier protection, or other property, and adhesion promotion to the exterior layers.

DISCLOSURE OF THE INVENTION

It is, therefore, an object of the present invention to provide multilayered film structures having oxygen, carbon dioxide and moisture barrier properties.

It is another object of the present invention to provide multilayered packaging films comprising polyolefins and heterogeneous polymer blends of gas/chemical barrier polymers with various polyolefins.

It is another object of the present invention to provide a method for the preparation of multilayered barrier products.

These and other objects, together with the advantages thereof over known multilayered polymer film products, which shall become apparent from the specification which follows, are accomplished by the invention as hereinafter described and claimed.

In general, the present invention provides multilayered barrier film products which comprise at least a first polymer film having low permeability to moisture and a heterogeneous polymer blend film containing a gas barrier polymer and a second polymer, the same as or compatible with the polymer of the first polymer film and distributed within the gas barrier polymer so as to allow the heterogeneous polymer blend film to adhere to the first polymer film.

The present invention also provides a method for the preparation of multilayered barrier film products which comprises the steps of forming a gas barrier polymer film from a heterogeneous polymer blend containing a gas barrier polymer and a second polymer, distributed within the barrier polymer and, bonding a moisture barrier polymer film to at least one side of the gas barrier film.

PREFERRED EMBODIMENT FOR CARRYING OUT THE INVENTION

The multilayered structures of the present invention display improved oxygen and moisture barrier properties as well as chemical resistance. A unique feature of these structures is the fact that the film layer providing the gas barrier properties is formulated so as to provide good adhesion to a polyolefin or other moisture barrier film layer bonded thereto without the necessity of a separate, adhesive tie layer.

In its most preferred form, the multilayered structures of the present invention comprise three layers: a heterogeneous inner layer prepared from a blend of gas or other chemical resistant polymer, usually of a polar nature, and a polymer of a non-polar nature; and, exterior layers comprising polymers of a non-polar nature that can be the same as or different from the non-polar polymer forming the heterogeneous inner layer. The non-polar polymer is present in the inner layer in an extremely particulate distribution state which provides good adhesion between the inner layer and the outside layers without the use of a tie layer adhesive.

Various blending process techniques can be employed to provide a proper dispersion of the non-polar polymer in the matrix of the gas/chemical resistant polar polymer. The non-polar polymer is likely distributed toward the surface of the film. As a result of this particulate distribution and depending upon the processing technique, the barrier polymer concentrates in large, continuous and oriented regions providing gas/chemical protection. The non-polar rich surface of the heterogeneous film layer insures a good adhesion to the outside layers due to simple interpenetration of individual layers at the interface and entanglement of the polymeric chains of similar nature in the exterior layers.

In a broader form, the multilayered structures of the present invention need not be limited to three layers but can be two-layered or more than three layers. Additionally, the heterogeneous inner layer may also be employed as a tie layer rather than as a gas/chemical barrier layer, to join together two exterior polymer layers and it can be formulated to provide properties other than gas or chemical resistance. All of these possibilities will be discussed in greater detail hereinbelow.

Moreover, while the present invention is primarily concerned with the preparation of layered barrier structures for packaging applications, the discovery of the self-adhering phenomena is not limited to barrier/chemical resistance multilayered structures for packaging applications. Hence, in addition to packaging films preparation by coextrusion or lamination, the invention also can be extended to sheet coextrusion or lamination processes and to subsequent fabricated articles prepared from sheet precursors.

Articles fabricated by thermoforming operations also could be prepared from the self-adhering heterogeneous inner layers described herein. Other articles such as bottles prepared by a combination of coextrusion and blow molding also could be prepared from the self-adhering heterogeneous inner layers of the present invention.

With respect to multilayered structures providing gas and/or chemical barrier protection, the heterogeneous inner layer typically employs a high gas barrier polymer matrix such as poly(ethylene vinyl alcohol) (EVOH), various high nitrile polymers, poly(vinylidene chloride) (PVDC) and the like as the polar polymer and a moisture resistant, non-polar polymer, such as a polyolefin. Thus, a preferred three-layered structure could be designated as A(B/A)A where A is a polyolefin and B is the barrier gas/chemical resistant component. Related structures include A(B/A)C and A(B/C)C where A and C are different polyolefins and B is the barrier gas/chemical resistant component. Structures such as A(B/A)D or A(B/D)D as well as D(B/A)D and D(B/D)D are also possible where A is a polyolefin, B is a barrier gas/chemical resistant component, and D is not a polyolefin. Still other structures such as D(B/A)E, D(B/D)E and D(B/E)E where A is a polyolefin, B is the barrier gas/chemical resistant component, and D and E are different polymers neither of which is a polyolefin are possible. Other three-layered structures are possible where B mentioned above as the barrier gas/chemical resistant component can be replaced by a different polymer, e.g., a high temperature resistant polymer, which is neither a barrier nor chemically resistant component.

The heterogeneous blend may also be used as a tie layer itself to join outside layers chemically the same or different than the components of the heterogeneous blend as noted hereinabove. Thus, three-layered structures such as A(B/A)B where A is a polyolefin and B is the barrier gas/chemical resistant component are possible. Still other structures such as F(B/A)G are possible where A is a polyolefin, B is a barrier gas/chemical resistant component, and F and G are chemically different from each other and form A and B. Furthermore, the use as a tie layer can be expanded to include replacing B, the barrier gas/chemical resistant component, with a polymer which is neither a barrier polymer nor a chemically resistant polymer, e.g., a high temperature resistant polymer.

The polymers F and G can also be employed to form the heterogeneous blend with a B, barrier gas/chemical resistant, component, e.g., B/F and B/G. While several of the typical structures have been disclosed herein, it is to be understood that the multilayered structures of the present invention can include combinations not recited. Generally, any of the polymers designated A, C, D, E, F or G can be utilized as the first polymer film as well as the second polymer that is employed to form the heterogeneous blend with a B polymer.

Where B is a gas/chemical barrier polymer, ethylene-vinyl alcohol copolymers (EVOH) can be used with ethylene content varying from 29 to 44 mole percent. Typical copolymers used are EVAL grades supplied by Kuraray Co., Ltd. and Soarnol grades supplied by Nippon Gohsei. Other barrier polymers include high nitrile polymers such as Barex 210 and Barex 218 (high acrylonitrile-methyl acrylate copolymers grafted onto a preformed poly(butadiene-acrylonitrile) elastomer); high acrylonitrile-styrene co- and terpolymers; high acrylonitrile-indene co- and terpolymers; and, homo-, co- or terpolymers high in methacrylonitrile content. Another class of barrier polymers which can be used is that derived from all common homo-, co-, or terpolymers based on vinylidene chloride (PVDC).

Representative examples of other gas barrier polymers include poly(vinyl chloride) (PVC); methyl methacrylate-styrene copolymers (70:30 weight percent, respectively) grafted onto a diene elastomer; amorphous polyamides (Trogamid T) and crystalline polyamides (nylon-6 and nylon-66); crystalline polyesters such as polyethylene terephthalate (PET); poly(ethylene 2,6-naphthalene dicarboxylate) (PEN); polyurethanes; polycarbonates (PC); polyphenylene oxide (PPO); polyphenylene oxide/polystyrene blends; polystyrene; polyetherimide and polyalkyl methacrylates. Selection of the gas barrier polymer will depend, in part, on the end use application which may require high gas barrier properties or only moderate properties.

The high nitrile polymers useful in this invention are those produced by polymerizing a major proportion of a monounsaturated nitrile, e.g., acrylonitrile, and a minor proportion of another monovinyl monomer or indene copolymerizable therewith, optionally in the presence of a diene rubber which may be a homopolymer or copolymer of a conjugated diene monomer.

The high nitrile polymer compositions can be prepared by any of the generally known techniques of polymerization including bulk polymerization, solution polymerization and emulsion or suspension polymerization by batch, continuous or intermittent addition of the monomers and other components. The preferred method is by emulsion or suspension polymerization in an aqueous medium in the presence of a free-radical generating polymerization initiator at a temperature of from about 0° C. to 100° C. in the substantial absence of molecular oxygen. A detailed description of the high nitrile polymer compositions, is provided in copending application U.S. Ser. No. 258,621, owned by the Assignee of record herein, the subject matter of which is incorporated herein by reference.

The most preferred nitrile polymers are prepared by the polymerization of between 70 and 80 parts by weight of a mononitrile and 20 to 30 parts by weight of an unsaturated carboxylic acid ester in the presence of from 5 to 15 parts by weight of a diene rubber. One particularly suitable nitrile polymer that can be employed as the gas barrier film is Barex 210, a trade name for the commercial product of BP America, Inc., a subsidiary of British Petroleum Company, which is a poly(acrylonitrile-methyl acrylate-butadiene) composition (70:21:9) having a number average molecular weight of 50,000.

Thermoplastic high nitrile resins of at least 70 percent by weight of a monounsaturated nitrile and up to 30 percent by weight of at least one other comonomer and which may also be rubber modified have previously been described in U.S. Pat. Nos. 3,426,102, 3,586,737 and 3,763,278, the subject matter of which is incorporated herein by reference. These polymers have excellent barrier properties and can be molded into containers, pipes, films, sheets and the like, to be used for packaging solids, liquids and gases of various types.

Where high gas/chemical resistant properties are not of primary concern, the B polymers can be selected for other functions such as, for instance, to provide systems with high temperature resistance characteristics. In this case, polymers that can be employed are selected from the group consisting of PC, PET, PEN, PPO, polysulfone, polyetherimides, thermoplastic polyimides and polybenzimidazoles (PBIS). Properties such as improved mechanical behavior can also be provided in the heterogeneous inner layer by the appropriate selection of one of the foregoing polymers.

The A and C polymers are preferably polyolefins based upon alphamonoolefin monomers having from about 2 to 6 carbon atoms. Typically, the useful polyolefins include low density polyethylene (LDPE), linear low density polyethylene (LLDPE), medium density polyethylene (MDPE), high density polyethylene (HDPE) and ultra high molecular weight polyethylene (UMWPE), polypropylene (PP), and common variations thereof. Polyolefins based on 4-methyl-1-pentene and copolymers thereof also can be used.

The non olefin polymers D and E which can form the outer layers of a multilayered structure and can be selected to form the heterogeneous inner layer with a B polymer include polymers such as polycarbonates (PC), polyethylene terephthalate (PET), poly(ethylene 2,6-naphthalene dicarboxylate) (PEN), and amorphous and crystalline polyamides. As an example, three-layered structures such as polycarbonate(Barex 210/polycarbonate)polycarbonate have now been prepared which exhibit excellent peel strength and improvement in chemical resistance compared to that observed for polycarbonate. The use of polyethylene terephthalate could produce PET(EVOH/PET)PET three-layered structures for tie-layerless systems, important for food packaging designed for microwaving. The non olefin polymers F and G which can form the outer layers of a multilayered structure and can be selected to form the heterogeneous inner layer with a B polymer include polymers such as PPO, polysulfones, thermoplastic polyimides, polyetherimides and PBIS.

The present invention could also include a host of other self-adhering type structures which may not necessarily be utilized in a packaging application. Other heterogeneous blends and corresponding inner layer films for three-layered structures could be comprised of a combination of conventional polyesters (saturated or unsaturated), polyamides (crystalline and/or amorphous), polyethers, polycarbonates, polysiloxanes, polysulfones, polyphenylene sulfide, polyether ether ketones, thermoplastic polyimides, polybenzimidazoles, polyquinoxalones, polyoxazolines, common vinyl polymers such as ABS, PVC and styrene-acrylonitrile copolymer, polystyrene, polyacrylates, polymethacrylates, vinyl acetate containing polymers, maleic anhydride containing polymers, butadiene and/or isoprene based elastomers, thermotropic liquid crystal polymers based on polyesters, polyamides or polyesteramides, block copolymers of styrene-butadiene and styrene-isoprene, and thermoplastic elastomers. Corresponding outside layers of these three-layered structures could be comprised of other polymers listed herein or of polyolefins described previously. Two-layered structures from various combinations of these polymers also are envisioned. If desired, the self-adhering concept could be applied to the preparation of four-, five-, six-, or seven-layered structures through a combination of processing techniques.

Because the B polymer of the heterogeneous blend inner layer can provide a variety of properties such as gas barrier, chemical barrier, heat barrier and the like, it shall be referred to herein for convenience as the barrier polymer, or the matrix polymer for the particulate polymer distributed therein. The other, or second, polymer blended with the barrier polymer shall be referred to herein as the distributed particulate polymer, distributed polymer or particulate polymer and, as noted hereinabove, it can include any of the polyolefins, or A and C polymers, as well as the non-polyolefins, or D, E, F and G polymers. These olefin and nonolefin polymers, it will be recalled, also comprise the exterior polymer layer or layers bonded to the heterogeneous inner layer in the two-layered or multilayered structures.

The present invention also contemplates blending of the gas barrier polymer with a functionalized polyolefin to form the heterogeneous blend inner layer. From related investigations, we have found that polyolefin functionalization with polar moieties leads to compatibilization with high nitrile polymers. More particularly, at the molecular level, functional groups, inserted onto polyolefin chains, give rise to molecular interactions with reactive sites of high nitrile polymer chains. These interactions are believed to be responsible for the compatibility of the blends.

Suitable polyolefins that can be blended with the barrier polymer are formed from alpha-monoolefin monomers having from 2 to about 6 carbon atoms. Representative examples include poly(ethylene) or PE; poly(propylene) or PP and poly(ethylene-co-propylene) or PEP. The polyolefins can be functionalized or modified with unsaturated compounds such as unsaturated carboxylic acids, esters, anhydrides and imides which include, for instance, acrylic and methacrylic acid; acrylates and methacrylates; maleic anhydride; N-phenylmaleimide and the like. The functionalization of polyolefins with such molecules bearing polar groups can be performed by means of copolymerization or grafting reactions promoted by radical initiators. Accordingly, representative functionalized polyolefins include poly(ethylene-co-maleic anhydride) or PEMA;- poly(ethylene-g-maleic anhydride) or PE-g-MA; poly(propylene) grafted with maleic anhydride or PP-g-MA; and poly(propylene) grafted with acrylic acid or PP-g-AcA. Ternary blends can also be formed, based on the foregoing binary blends, which contain a third or ternary unfunctionalized polyolefin as above, being formed from a monomer having 2 to about 6 carbon atoms or, a different, functionalized polyolefin as above, that is, being formed from an alpha olefin monomer having 2 to about 6 carbon atoms and functionalized with one of the foregoing unsaturated compounds. Such ternary blends can contain high density polyethylene or HDPE, or isotactic polypropylene or PP as a third component.

Functionalization of the polyolefin can be accomplished by a grafting procedure which involves forming a solution of the polyolefin followed by the addition of the unsaturated monomer and a free radical initiator such as dicumyl peroxide. The grafting reaction may also be carried out by adding unsaturated monomer and initiator to molten polyolefin in an extruder.

Ethylene-maleic anhydride copolymer (PEMA) can also be prepared by reacting ethylene and maleic anhydride in an autoclave with or without a solvent such as toluene at a temperature of 85° to 100° C. in the presence of benzoyl peroxide and at pressures of 860 to 950 atmospheres (87.2 to 96.3 MPa). A more complete discussion regarding functionalized polyolefins as described herein appears in copending application, U.S. Ser. No. 258,621, the subject matter of which is incorporated herein by reference.

Blends of the barrier polymer and the distributed particulate polymer can comprise from about 1 to 99 parts by weight of the barrier polymer and from about 99 to 1 parts by weight of the distributed polymer. Such blends are prepared by conventional solution or melt blending, the latter being preferred. For solution blending a mutual solvent such as dimethylformamide (DMF) or N,N-dimethylacetamide (DMAC) and the like is selected to which the polymers are added. Mixing occurs at ambient pressure and temperature for a time of from about 1 to 6 hours. Polymer films can be subsequently formed by casting, evaporation of the solvent and drying, as is known in the art.

For melt blending, the polymer components can be combined in a Brabender Plasticorder at temperatures of about 180° C., or the necessary temperature to melt the components. Films can be prepared by compression molding at about 180° C., followed by slow cooling to ambient temperature.

Preparation and characterization of the properties of blends comprising high nitrile polymers and functionalized polyolefins has been described in U.S. Pat. No. 4,914,138, owned by the Assignee of record herein. The subject matter of that application is incorporated herein by reference.

Regarding the exterior layers of the multilayered film products of the present invention, a suitable polymer having water or vapor barrier properties, and referred to collectively as moisture barrier, is selected. The selection of the exterior polymer layers will also depend, in part, upon the end use application which may require high water/vapor barrier properties, e.g., low permeability, or only moderate properties. The fact that certain polymers such as polycarbonate, PVC and the like can be selected as the barrier polymer or the moisture barrier polymer is attributable again to the end use application.

Where very high gas barrier properties are desired, a high nitrile polymer may be selected. While a multilayered structure can be prepared utilizing a polyolefin as the exterior, moisture barrier layer, a more polar material such as polycarbonate would allow better adhesion. In another instance, gas barrier properties may not be as important as moisture barrier and, therefore, polycarbonate can be provided in the inner layer of a multilayered structure with a more aggressive moisture barrier exterior layer such as a polyolefin. Of course, it is not likely that the inner and outer layers of a given product would both contain the same major polymer component such as a polycarbonate because the purpose of the invention is to provide multilayered structures having dissimilar layers and which do not require an adhesive layer therebetween.

With respect to the principal invention, while a single water or vapor barrier polymer film can be laminated or coextruded to the gas barrier film layer to form a bi-layer structure for some embodiments, the preferred form is to employ two such layers, with the inner, barrier layer sandwiched therebetween, providing a tri-layer structure. Such products can be prepared in any conventional manner for handling polymer films such as coextrusion. Inasmuch as an adhesive layer can be eliminated by the use of a heterogeneous gas barrier polymer film, the present invention is not limited to any specific lamination or coextrusion techniques.

Exemplary three-layer films of the present invention comprise HDPE(Barex/HDPE)HDPE; LLDPE(EVOH/LLDPE)LLDPE; LLDPE(EVOH/HDPE)LLDPE;HDPE(Barex/PEMA/HDPE)HDPE and the like. These and other multilayered structures can be prepared via conventional means including coextrusion and laminating according to conditions typically employed to prepare polymer films and coextruded structures. It is to be appreciated that conventional fabrication techniques can be employed to form these materials into the shape required for rigid and semi-rigid packaging uses. Again, it can be appreciated that coextrusion is immediately simplified because intermediate tie layers need not be coextruded. Hence, the coextrusion die employed to produce a tri-layer structure only requires three separate passageways, rather than five. Of course, if an optional tie layer is to be employed, as described hereinabove, then a conventional coextrusion die can be employed.

In order to demonstrate practice of this aspect of the present invention, multilayered structures were fabricated and tested as reported hereinbelow. The inner, barrier layer films were formed from polymer blends of EVOH and LLDPE; of EVOH and HDPE; of Barex 210 and HDPE and, of Barex 210, PEMA and HDPE, with variations in the amounts of each component. Film thicknesses were not measured and it is to be understood that appropriate optimizations of film thicknesses can be readily made by those skilled in the art depending upon the barrier requirements desired in the resulting multilayered film product.

Preparation of 50/50 EVOH/LLDPE Heterogeneous Blend Films by Compression Molding The blend was prepared by mixing 25 g each of EVAL EP-F 101A and LLDPE (Dowlex 2056 E) in a torque rheometer (C. W. Brabender, model PLD-331) set at 35 rpm and an initial temperature of 200° C. The LLDPE was introduced first to the mixing chamber previously sprayed with fluorocarbon mold release agent and allowed to fuse. After one minute of mixing, the EVAL was slowly added during three to four minutes. The mixture was stirred an additional three to four minutes. The total time for preparation of the blend was approximately seven minutes.

At the end of seven minutes the blend was quickly removed from the Brabender (about 30 seconds to one minute required) and immediately transferred to a preheated mold (sprayed with fluorocarbon mold release agent) in a preheated Wabash press. A plaque (7.5 cm × 15 cm × 0.31 cm) was prepared by pressing the mold at 13.8 MPa and 200° C. for two minutes followed by water cooling the presses under the applied pressure for 10–12 minutes. The plaque was cut into 2.5 cm squares using a band saw, the blade of which had been previously cleaned by cutting plaques of similar material. Any foreign materials left on the edges of the squares was removed by trimming. The surfaces of the squares were cleaned with acetone to remove fluorocarbon mold release agent.

Films from immiscible blends were prepared by compression molding 2.5 cm squares from the plaques between top and bottom platens cut from an EKCO Baker's Secret cookie sheet (metallic surfaces coated with nontoxic FDA approved silicone compounds). Conditions were 6.9 MPa at 218° C. for one minute. The thickness of these films was about seven mils (177.8 microns).

Preparation of LLDPE Films by Compression Molding

The bottom 15 cm × 15 cookie sheet platen was placed in a press preheated to 190.5° C. About 20 g of LLDPE pellets were spread out over the bottom cookie sheet platen. After the pellets were essentially melted (about 2.5 to 3 minutes required), the top 15 cm × 15 cm cookie sheet platen was positioned over the bottom, and the assembly was pressed at 190.5° C. and then cooled to room temperature. Excess LLDPE which flowed beyond the 15 cm square film was trimmed.

Preparation of Self-Adhering, Three-Layered Laminates by Compression Molding

Three-layered, self-adhering laminated structures consisting of 50/50 EVOH/LLDPE middle layer and LLDPE outside layers were prepared in the Wabash press using top and bottom cookie sheet platens at 218° C. and 6.9 MPa for one minute followed by water cooling to room temperature. An attempt was made to keep the thickness of the outside layers and inner layer within about two mils of each other. Average thickness of outside layers and inner layer used was about seven mils. Typically, either 6.25 cm square outside and inside films or 10 cm square films were used. The final thickness of the three-layered laminate ranged between 12 to 20 mils.

Following the foregoing procedures, other blends and three layered laminates were prepared, the compositions of which are presented in Tables I and II hereinbelow. The copolymer PEMA was obtained from Aldrich Chemical Co. and the nitrile polymer, Barex 210, was obtained from BP America, Inc., as noted hereinabove. These laminates were tested for permeability to water vapor, e.g., water vapor transmission rate (WVTR) and oxygen permeability, or oxygen transmission rate (OTR), also reported in Tables I and II. Finally, peel strength for several of the structures were measured and have been reported in the Tables.

Preparation of Three-Layered Self-Adhering Structures by Coextrusion

A 50/50 heterogeneous blend of EVOH/LLDPE was prepared in a twin screw extruder. The extrudate was pelletizied. The 50/50 EVOH/LLDPE pellets and LLDPE pellets were added to separate extruders connected to a film die for coextrusion. The resulting coextruded film consisting of three layers of LLDPE(50/50 EVOH/LLDPE)LLDPE was blown and collected on conventional take-off equipment. The coextruded film was found to be remarkably clear. Repeated stressing and flexing of the coextruded film did not cause a change in its appearance and no delamination was observed.

Scanning electron microscopy (SEM) examinations of LLDPE(50/50 EVOH/LLDPE)LLDPE film revealed the existence of very even three-layered structures. The thickness of the three layers was approximately the same. The permeability to oxygen at 100% relative humidity and 23° C. was 1.7 cc mil/100 in$^2$ 24 hrs. atm.

TABLE I

| | Permeability Data of Self-Adhering Laminates Based on EVOH | | |
|---|---|---|---|
| Ex. No. | Laminate Structure | Water Vapor Permeability g mil/100 in$^2$ 24 hrs. | Oxygen Permeability mil cm$^3$/100 in$^2$ 24 hrs., atm | Peel Strength, pli |
| 1 | HDPE(EVOH/HDPE)HDPE 70/30 | 0.33 | 0.31, 2.89, 3.06 | 1.27 |
| 2 | LLDPE(EVOH/LLDPE)LLDPE 65/35 | | 0.58 | |
| 3 | LLDPE(EVOH/LLDPE)LLDPE 60/40 | | 0.81 | |
| 4 | LLDPE(EVOH/HDPE)LLDPE 50/50 | | 0.31, 0.70 | |

TABLE II

Permeability Data of Self-Adhering Laminates Based on Barex 210

| Ex. No. | Laminate Structure | Water Vapor Permeability g mil/100 in$^2$ 24 hrs. | Oxygen Permeability mil cm$^3$/100 in$^2$ 24 hrs., atm | Peel Strength, pli |
| --- | --- | --- | --- | --- |
| 5 | HDPE(B210/HDPE)HDPE 75/25 | 0.22 | 1.93, 2.6, 3.02 | |
| 6 | HDPE(B210/HDPE)HDPE 70/30 | | 2.73 | 1.56 |
| 7 | HDPE(B210/HDPE)HDPE 60/40 | | 2.59 | |
| 8 | HDPE(B210/HDPE)HDPE 50/50 | | 0.22, 6.7 | 3.74 |
| 9 | HDPE(B210/PEMA/HDPE)HDPE 50/17/33 | | 1.44 | 1.9 |

By comparing the permeability data appearing in Tables I and II it can be seen that outstanding water vapor permeability and excellent oxygen permeability can be achieved in a three-layered structure with good adhesion in the absence of an adhesive tie layer.

Thus, it should now be evident that the multilayer structures of the present invention exhibit excellent gas and moisture barrier protection in combination with other properties. They can also be fabricated into different shapes and forms designed to meet various use requirements. The multilayered structures can also be produced in different colors since the interior layer can be colored or printed in the conventional manner.

It is to be understood that the use of polyolefins in the heterogeneous blend layer and the exterior layers has been provided merely to demonstrate practice of the subject invention. Similarly, practice of the present invention should not be limited to poly(ethylene vinyl alcohol) or to the specific high nitrile polymer or functionalized polyolefin exemplified herein. Those skilled in the art may readily select other polyolefins, non-polyolefins and other barrier polymers according to the disclosure made hereinabove. Moreover, it is to be understood that the multilayered products of the present invention can comprise articles other than the film structures exemplified herein.

Thus, it is believed that any of the variables disclosed herein can readily be determined and controlled without departing form the scope of the invention herein disclosed and described. Moreover, the scope of the invention shall include all modifications and variations that fall within the scope of the attached claims.

We claim:

1. Multilayered barrier film products comprising
at least a first polymer film having low permeability to moisture and
a heterogeneous polymer blend film containing from about 1 to 99 parts by weight of a gas barrier polymer and from about 99 to 1 parts by weight of a second polymer the same as or compatible with said first polymer film and distributed within said gas barrier polymer so as to allow said heterogeneous polymer blend film to adhere to said first polymer film.

2. Multilayered barrier film products, as set forth in claim 1, wherein said heterogeneous polymer blend film comprises:
a polymer selected from the group consisting of poly(ethylene vinyl alcohol), poly(vinylidene chloride), poly(vinyl chloride), methyl methacrylate-styrene copolymers grafted onto a diene elastomer, amorphous and crystalline polyamides, crystalline polyesters, poly(ethylene 2,6-naphthalene dicarboxylate), polyurethanes, polycarbonates, polyphenylene oxide, polystyrene, polyphenylene oxide/polystyrene blends, polyetherimide, thermoplastic polyimides, high nitrile polymers produced by polymerizing a major proportion of a monounsaturated nitrile and a minor proportion of another monovinyl monomer or indene copolymerizable therewith, high nitrile polymers produced by polymerizing a major portion of a monounsaturated nitrile and a minor portion of another monovinyl monomer or indene copolymerizable therewith in the presence of a diene rubber, polyacrylates, polymethacrylates, polyalkyl methacrylates, polyethers, polysiloxanes, polysulfones, polyphenylene sulfide, polyether ether ketones, thermoplastic polyimides, polybenzimidazoles, polyquinoxalones, polyoxazolines, styrene-acrylonitrile copolymer and acrylonitrile-butadiene-styrene copolymer, vinyl acetate containing polymers, maleic anhydride containing polymers, butadiene and/or isoprene based elastomers, thermotropic liquid crystal polymers based on polyesters, polyamides and polyesteramides, block copolymers of styrenebutadiene and styrene-isoprene, and thermoplastic elastomers, and
said second polymer selected from the group consisting of polyolefins prepared from alpha olefin monomers having from 2 to about 6 carbon atoms, said polyolefins functionalized with an unsaturated compound selected from the group consisting of unsaturated carboxylic acids, esters, anhydrides and imides; amorphous and crystalline polyamides, crystalline polyesters, poly(ethylene2,6-naphthalene dicarboxylate), polycarbonates, methyl methacrylate-styrene copolymer grafted onto a diene elastomer, polyphenylene oxide, polystyrene, polyphenylene oxide/polystyrene blends, poly(vinyl chloride), polyacrylates, polymethacrylates, polyalkyl methacrylates, polyethers, polysiloxanes, polysulfones, polyphenylene sulfide, polyether ether ketones, thermoplastic polyimides, polybenzimidazoles, polyquinoxalones, polyoxazolines, styrene-acrylonitrile copolymer and acrylonitrile-butadiene-styrene copolymer, vinyl acetate containing polymers, maleic anhydride containing polymers, butadiene and/or isoprene based elastomers, thermotropic liquid crystal polymers based on polyesters, polyamides and polyesteramides, block copolymers of styrene-butadiene and styrene-isoprene, and thermoplastic elastomers.

3. Multilayered barrier film products, as set forth in claim 2, wherein said first polymer film is selected from the group consisting of polyolefins prepared from alpha olefin monomers having from 2 to about 6 carbon atoms, amorphous and crystalline polyamides, crystalline polyesters, poly(ethylene 2,6-naphthalene dicarboxylate), polycarbonates, methyl methacrylate-styrene copolymer grafted onto a diene elastomer, polyphenylene oxide, polystyrene, polyphenylene oxide/polystyrene blends, poly(vinyl chloride), polyacrylates, polymethacrylates, polyalkyl methacrylates, polyethers, polysiloxanes, polysulfones, polyphenylene sulfide, polyether ether ketones, thermoplastic polyimides, polybenzimidazoles, polyquinoxalones, polyoxazolines, styreneacrylonitrile copolymer and acrylonitrile-butadiene-styrene copolymer, vinyl acetate containing polymers, maleic anhydride containing polymers, butadiene and/or isoprene based elastomers, thermotropic liquid crystal polymers based on polyesters, polyamides and polyesteramides, block copolymers of styrenebutadiene and styrene-isoprene, and thermoplastic elastomers.

4. Multilayered barrier film products, as set forth in claim 3, further comprising
a third polymer film layer having low permeability to moisture, said heterogeneous polymer blend film being sandwiched between said first and third films.

5. Multilayered barrier film products, as set forth in claim 4, wherein said gas barrier polymer is poly(acrylonitrile-methyl acrylate-butadiene).

6. Multilayered barrier film products, as set forth in claim 5, wherein said second polymer is a polyolefin.

7. Multilayered barrier film products, as set forth in claim 5, wherein said first and third polymer films are polyolefins.

8. Multilayered barrier film products, as set forth in claim 7, wherein said second polymer is polyethylene.

9. Multilayered barrier film products, as set forth in claim 8, wherein said first and third polymer films are polyethylene.

10. Multilayered barrier film products, as set forth in claim 4, wherein said gas barrier polymer is poly(ethylene vinyl alcohol).

11. Multilayered barrier film products, as set forth in claim 10, wherein said second polymer film is polyolefin.

12. Multilayered barrier film products, as set forth in claim 11, wherein said first and third polymer films are polyolefins.

13. Multilayered barrier film products, as set forth in claim 12, wherein said second polymer is polyethylene.

14. Multilayered barrier film products, as set forth in claim 13, wherein said first and third polymer films are polyethylene.

15. Multilayered barrier film products, as set forth in claim 1, wherein said gas barrier polymer also provides chemical resistance.

* * * * *